(12) United States Patent
Henseler

(10) Patent No.: US 9,976,461 B2
(45) Date of Patent: May 22, 2018

(54) PARTICULATE FILTER FOR A MOTOR VEHICLE

(71) Applicant: Dr. Ing. h.c. F. Porsche Aktiengesellschaft, Stuttgart (DE)

(72) Inventor: Lukas Henseler, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 92 days.

(21) Appl. No.: 15/155,293

(22) Filed: May 16, 2016

(65) Prior Publication Data

US 2017/0009622 A1 Jan. 12, 2017

(30) Foreign Application Priority Data

Jul. 8, 2015 (DE) .................. 10 2015 110 997

(51) Int. Cl.
| | |
|---|---|
| *F01N 3/033* | (2006.01) |
| *F01N 1/08* | (2006.01) |
| *F01N 3/022* | (2006.01) |
| *B01D 46/42* | (2006.01) |

(52) U.S. Cl.
CPC .......... *F01N 3/0335* (2013.01); *F01N 1/083* (2013.01); *F01N 3/0222* (2013.01); *B01D 46/4236* (2013.01); *F01N 2340/00* (2013.01); *F01N 2470/08* (2013.01); *Y02T 10/20* (2013.01)

(58) Field of Classification Search
CPC .. B01J 35/00; B01J 35/04; F01N 3/28; B01D 53/86
See application file for complete search history.

(56) References Cited

U.S. PATENT DOCUMENTS

| | | | | | |
|---|---|---|---|---|---|
| 3,615,868 A | * | 10/1971 | Melone | ............... | G01F 23/2922 137/559 |
| 4,089,654 A | * | 5/1978 | Polinski | ............... | B01J 19/2485 422/633 |
| 5,080,953 A | * | 1/1992 | Horikawa | ................ | B01J 35/04 428/116 |
| 5,380,501 A | * | 1/1995 | Hitachi | .................. | B01D 53/86 422/180 |
| 6,040,064 A | * | 3/2000 | Bruck | ...................... | B01J 35/04 422/174 |

(Continued)

FOREIGN PATENT DOCUMENTS

| | | |
|---|---|---|
| DE | 39 30 680 | 3/1991 |
| DE | 101 37 878 | 2/2003 |
| DE | 20 2014 102 809 | 9/2014 |

OTHER PUBLICATIONS

German Search Report dated Mar. 10, 2016.

*Primary Examiner* — Amber R Orlando
*Assistant Examiner* — Britanny Precht
(74) *Attorney, Agent, or Firm* — Gerald E. Hespos; Michael J. Porco; Matthew T. Hespos

(57) ABSTRACT

A particulate filter for a motor vehicle has a casing (2) that allows through flow. A core (4) is accommodated in the casing (2) and allows through flow. The casing (2) has a longitudinal axis (3). A through flow duct (9) is formed between the casing (2) and the core (4) to allow the through flow of exhaust gas from an internal combustion engine of the motor vehicle. A ring (7) is arranged in the through flow duct (9) and gives the through flow duct (9) a labyrinth-type configuration.

8 Claims, 2 Drawing Sheets

(56) References Cited

U.S. PATENT DOCUMENTS

| | | | | |
|---|---|---|---|---|
| 7,736,717 B2* | 6/2010 | Muller | ............... | F01N 3/0222 |
| | | | | 422/177 |
| 8,506,663 B2* | 8/2013 | Komori | ............ | B01D 46/2459 |
| | | | | 55/385.3 |
| 2002/0146360 A1* | 10/2002 | Bruck | ............ | F01N 3/28 |
| | | | | 422/211 |
| 2003/0095896 A1* | 5/2003 | Shirahata | ............ | F01N 3/28 |
| | | | | 422/180 |
| 2004/0156761 A1* | 8/2004 | Bruck | ............ | B01J 35/04 |
| | | | | 422/179 |
| 2005/0186127 A1* | 8/2005 | Reck | ............ | B01D 53/94 |
| | | | | 422/180 |
| 2009/0011176 A1* | 1/2009 | Ichikawa | ............ | B01D 46/2422 |
| | | | | 428/116 |
| 2010/0206406 A1* | 8/2010 | Nakamura | ............ | F16K 1/2268 |
| | | | | 137/544 |

* cited by examiner

PARTICULATE FILTER FOR A MOTOR VEHICLE

CROSS REFERENCE TO RELATED APPLICATION

This application claims priority under 35 USC 119 to German Patent Appl. No. 10 2015 110 997.2 filed on Jul. 8, 2015, the entire disclosure of which is incorporated herein by reference.

BACKGROUND

1. Field of the Invention

The invention relates to a particulate filter for a motor vehicle.

2. Description of the Related Art

Particulate filters for motor vehicles were developed originally to reduce particulate or soot emissions from motor vehicles with diesel engines. Particulate or soot emissions are dependent on a combustion process in a combustion engine or internal combustion engine and are now also being used to reduce emissions from spark ignition engines.

Owing to their positioning in an exhaust tract of the internal combustion engine, particulate filters influence an engine-specific exhaust sound of the motor vehicle. Basically, they act as low pass filters, wherein higher frequencies are filtered. More specifically, high frequencies of the exhaust gas noise are attenuated, thereby changing an original sound characteristic of the motor vehicle. The prior art particulate filter thus has a narrow frequency spectrum, where a frequency spectrum means a certain number of different high and low frequencies. The prior art particulate filter that acts as a low pass filter has a narrow frequency spectrum since relatively high and high frequencies are filtered and are no longer audible.

Particulate filters must comply with legal directives relating to the exhaust sound or the exhaust noise with respect to noise emissions or volume. However, consumers should be able to associate vehicles from a particular company or with a certain vehicle type merely on the basis of the exhaust sound or exhaust noise.

DE 20 2014 102 809 U1 discloses an exhaust module for a combustion engine. The exhaust module has an exhaust gas purification module and an acoustic module arranged downstream of the exhaust gas purification module to enable the exhaust sound of the combustion engine to be modified, adapted or personalized.

It is the object of the present invention to provide a particulate filter for a motor vehicle having a wider frequency spectrum.

SUMMARY

The invention relates to a particular filter for a motor vehicle. The particulate filter has a casing and a core. The casing allows through flow and has a longitudinal axis. The core is accommodated in the casing and allows through flow. A through flow duct is formed in the casing between the casing and the core to allow through flow of exhaust gas from an internal combustion engine of the motor vehicle. The through flow duct has a labyrinth-type configuration with the aid of a ring in the through flow duct. The particulate filter advantageously enables high-frequency noise components to be attenuated to a lesser extent without the particulate filter being bypassed by the exhaust gas flow. Thus, a particulate filter having a broader frequency spectrum than the prior art is obtained.

Conventional particulate filters have the core surrounded by the casing, and the exhaust gas flows through the core via an inlet area. However, the flow ducts formed in the core are alternately closed at one end. As a result, complete through flow of the core can take place only by transfer into a flow duct open in an outlet area of the core. Thus, the exhaust gas can pass through the conventional particulate filter only by more or less continuous changing of the flow duct, this also being matched to the prevailing pressure conditions. This leads to filtering of relatively high to high-frequency noise components of the exhaust or exhaust gas noise.

The exhaust gas flowing between the core and the casing is passed predominantly through the through flow duct formed with the aid of the ring from the inlet area to the outlet area. The configuration of the ring enables the entire flow to be deflected through the particulate filter. This leads to a reduction in the low-frequency noise components of the exhaust gas, as a result of which relatively high-frequency components make up a larger proportion of the exhaust noise as compared with the prior art.

The ring enables the exhaust noise or exhaust sound of the particulate filter to be adapted or optimized acoustically. A configuration of the ring and hence the through flow duct permits the exhaust sound to be matched to a required exhaust sound. This means that it is not necessary to change the entire configuration of the particulate filter, the only requirement being to change the ring formed between the core and the casing, thereby achieving a simple and low-cost production.

The ring has an outer ring and an inner ring, and an axial first clearance is formed between the outer ring and the inner ring. This leads to a further deflection of the exhaust gas flow within the ring and thus offers a further possibility for adapting the noise.

The noise may be adapted or the sound may be shaped by forming a first radial clearance between a core outer wall of the core and the ring and by forming a second radial clearance between a casing inner wall of the casing and the ring.

A first outside diameter of the outer ring may be greater than a second outside diameter of the inner ring. Additionally, a first inside diameter of the outer ring may be greater than a second inside diameter of the inner ring. Furthermore, the first inside diameter may less than the second outside diameter. This leads to a radial overlap between the outer ring and the inner ring for further noise adaptation.

The ring may allow at least partial radial through flow. This means that the ring itself is configured to absorb or reduce particulates. This provides the advantage of achieving a further reduction in particulates in the exhaust gas emissions.

A further ring may adjoin the ring axially and an axial second clearance is formed between the further ring and the ring. As a result, there is a further possibility of noise adaptation. In principle, the further ring does not have to be of identical design to the ring. For example, a through flow duct section may be formed by the further ring in accordance with the required exhaust noise to adapt to the required exhaust noise independently of the ring. An assembly of the outer ring and the inner ring may be referred to as a stage. It is possible for the through flow duct to be designed in the form of an n-stage labyrinth by arranging a certain number n of rings in series.

The acoustics of the particulate filter can be adjusted or defined by means of the number of stages, the extent and arrangement of the rings between the casing inner wall and the core, the overlap between the outer and inner rings and the arrangement of the rings relative to one another.

The core may be produced from a ceramic, e.g. cordierite, or a metal.

Further advantages, features and details of the invention will become apparent from the following description of preferred illustrative embodiments and with reference to the drawing. The features and combinations of features mentioned above in the description and those mentioned in the description of the figures below and/or features and combinations of features shown only in the figures can be used not only in the respectively indicated combination but also in other combinations or in isolation without exceeding the scope of the invention. Identical reference signs are assigned to identical or functionally identical elements. For reasons of clarity, it is possible that the elements will not be provided with their reference sign in all the figures, without however losing their association.

DETAILED DESCRIPTION

Figure 1:
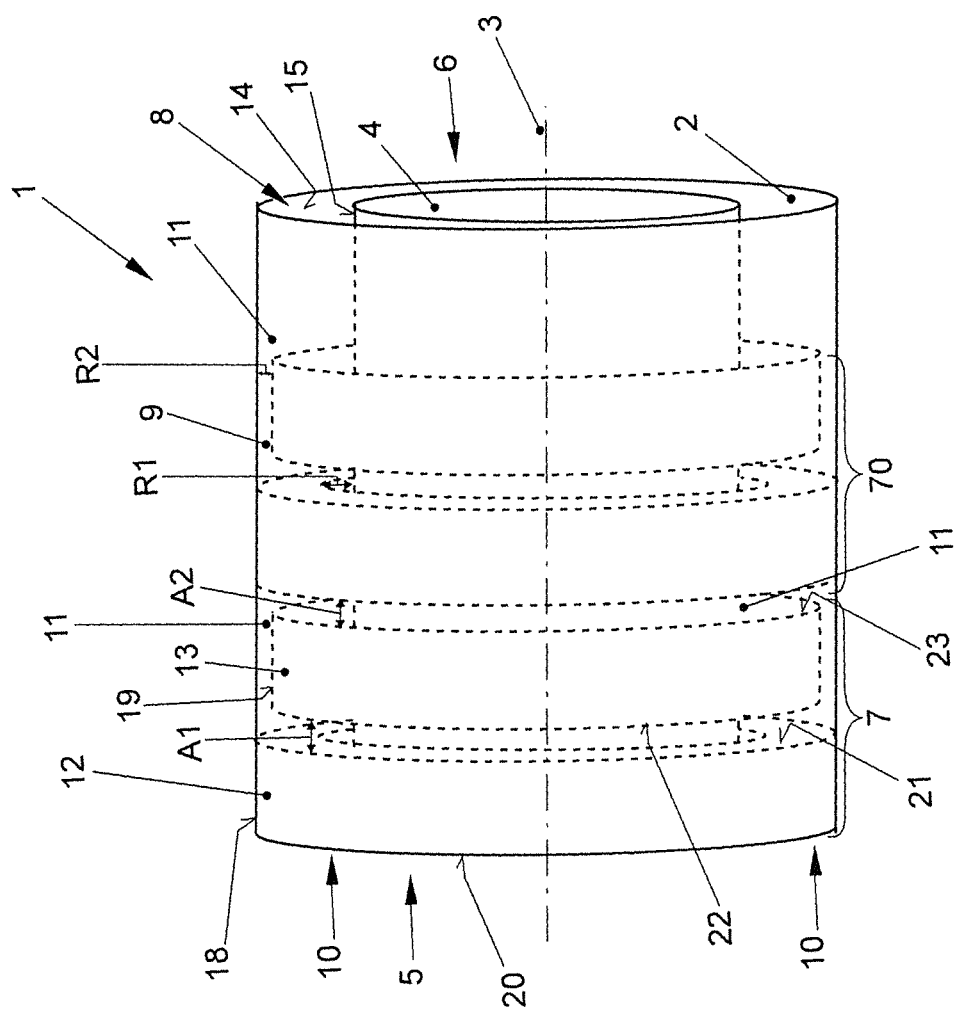
FIG. 1 is a perspective view of a particulate filter according to the invention.
Figure 2:
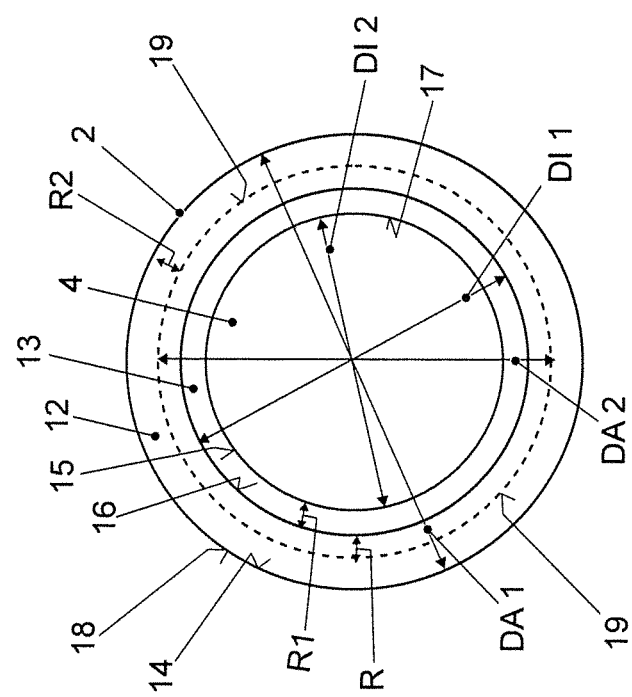
FIG. 2 is a cross-section of the particulate filter of FIG. 1.

A particulate filter 1 according to the invention is identified by the numeral 1 in FIG. 1. The particulate filter 1 is arranged in a motor vehicle exhaust line that allows a through flow. The exhaust line is connected to a motor vehicle internal combustion engine (not shown) so that exhaust gases from the internal combustion engine can flow through the exhaust line.

The particulate filter 1 is designed to reduce particulate- or soot-containing emissions from the internal combustion engine. More specifically, the particulate filter 1 has a casing 2 with a longitudinal axis 3. A core 4 is accommodated in the casing 2 and allows through flow.

The core 4 that allows through flow is a "monolith" produced from a ceramic material. This monolith 4 has a multiplicity of flow ducts (not shown) that extend in the direction of the longitudinal axis 3 from an inlet area 5 of the core 4 to an outlet area 6 of the core 4. The flow ducts are closed alternately at one end. This means that, if the flow duct is open in the inlet area 5, it is closed in the outlet area 6 and vice versa.

Flow of the exhaust gas from the inlet area 5 into the outlet area 6 takes place via core walls of the core 4 that are formed between the flow ducts. The core walls are porous and thus allow through flow. Hence, particulates of a certain particle size settle on the core walls and do not flow via the outlet area 6. The alternation of open and closed flow ducts produces a positive guidance of the exhaust gas in that the exhaust gas must flow from one flow duct into an adjacent flow duct via the core walls.

The particulate filter 1 has a ring 7 surrounding the core 4. The ring 7 is arranged in a free flow cross section 8 of the particulate filter 1 between the casing 2 and the core 4 and thus represents a flow resistance in the free flow cross section 8. With the aid of the ring 7, a labyrinth-type through flow duct 9 is formed in the casing 2. More specifically, the through flow duct 9 has an inlet cross section 10 formed facing the inlet area 5 and an outlet cross section 11 formed facing the outlet area 6. The entire through flow duct 9 allows through flow in the direction of the longitudinal axis 3.

The particulate filter 1 of FIG. 1 has a two-part ring 7 that comprises an outer ring 12 and an inner ring 13 arranged in series in the direction of flow from the inlet area 5 to the outlet area 6. The outer ring 12 and the inner ring 13 are arranged between a casing inner wall 14 of the casing 2 and a core outer wall 15 of the core 4.

The outer ring 12 has a first ring inner wall 16 that is arranged opposite the core outer wall 15 to form a first radial clearance R1. The inner ring 13 has a second ring inner wall 17 that also is arranged opposite the core outer wall 15 so that no radial clearance is formed between the second ring inner wall 17 and the core outer wall 15 in this first illustrative embodiment. However, it would also be possible for a radial clearance to be formed between the two walls.

A first ring outer wall 18 of the outer ring 12 is arranged opposite the casing inner wall 14 and adjoins the casing inner wall 14. In other words, no radial clearance is formed between the casing inner wall 14 and the first ring outer wall 18 in the first illustrative embodiment. The inner ring 13 has a second ring outer wall 19 that is arranged opposite the casing inner wall 14 to form a second radial clearance R2.

The outer ring 12 and the inner ring 13 are arranged to maintain an axial first clearance A1 with respect to one another.

The through flow duct 9 thus extends in the form of a labyrinth from its inlet cross section 10 to its outlet cross section 11 via a first section axially between the core 4 and the outer ring 12, onward via a second section radially between the outer ring 12 and the inner ring 13 and, finally, via a third section, once again axially between the casing inner wall 14 and the inner ring 13.

In a second embodiment (not shown), the through flow duct 9 is formed as a labyrinth in a one-piece ring 7. Depending on requirements with respect to the exhaust gas noise, the ring 7 can be arranged in the casing 2 so as to surround the core 4 while maintaining a radial clearance between the core 4 and/or the casing inner wall 14.

In the first embodiment, the outer ring 12 and the inner ring 13 are designed to overlap partially. A first outside diameter DA1 of the outer ring 12 is greater than a second outside diameter DA2 of the inner ring 13, and a first inside diameter DI1 of the outer ring 12 is greater than a second inside diameter DI2 of the inner ring 13. Additionally, the first inside diameter DI1 is less than the second outside diameter DA2.

The outer ring 12 and the inner ring 13 are designed to allow through flow, with particulates in the exhaust gas being deposited or collected on the rings 12, 13. Like the core 4, they have flow ducts that alternately are closed at one end.

A first ring inlet area 20 faces the inlet area 5, and the exhaust gas enters the flow ducts of the outer ring 12 that are open in this first ring inlet area 20. The outer ring 12 is designed to correspond to the core 4. Thus, the exhaust gas can flow via ring walls formed in the outer ring 12 from one flow duct into a flow duct that is open in a ring outlet area 21 to face away from the first ring inlet area 20. Thus, the exhaust gas entering the outer ring 12 in the ring inlet area 20 can emerge with a reduced level of particulates via the first ring outlet area 21 thereof.

The particulate filter 1 shown in FIG. 1 has a ring 70 in addition to the ring 7. The ring 70 comprising an outer ring 12 and an inner ring 13. The ring 70 axially adjoins the ring 7 and has a second axial clearance A2 with respect to ring 7 surrounding the core 4. It is self-evident that the particulate filter 1 could have a plurality of rings 7 and 70. The exhaust gas noise can be adapted to specific requirements, depending on the configuration and number of the rings 7, 70. In the illustrative embodiment, the ring 7 and the further ring 70 are of identical design. However, they could be of different designs.

The particulate filter 1 has an improved sound configuration and an improved absorption of particulates. Furthermore, the ring 7 also absorbs particulates and enables a reduced pressure drop across the particulate filter 1 due to the capacity for appropriate configuration of the free flow cross-sectional area of the through flow duct 9 in the particulate filter 1.

The exhaust gas flowing through the through flow duct 9 can flow through both the particulate-absorbing core 4 and the particulate-absorbing rings 12, 13 via the ring inner walls 16, 17 and the ring outer walls 18, 19 and via the ring inlet and outlet areas 20, 21, 22, 23 thereby bringing about improved absorption of particulates and thus reduced exhaust gas emissions. At the same time, the free flow cross-sectional area can be enlarged to reduce the pressure drop without diminishing the reduction in emissions. Thus, for example, the exhaust gas flowing between the core 4 and the outer ring 12 is directed onto the inner ring 13 due to an overlap R between the outer ring 12 and the inner ring 13 and can flow through the inner ring. The exhaust gas flowing between the casing inner wall 14 and the inner ring 13 is directed onto the outer ring 13 of the further ring 70 by virtue of the overlap R between the outer ring 12 and the inner ring 13. Thus, particulates in the exhaust gas can be absorbed by at least one particulate-absorbing component 4, 7, 70 in the course of through flow of the particulate filter 1.

LIST OF REFERENCE SIGNS 1 particulate filter
2 casing
3 longitudinal axis
4 core
5 inlet area
6 outlet area
7 ring
8 free flow cross section
9 through flow duct
10 inlet cross section
11 outlet cross section
12 outer ring
13 inner ring
14 casing inner wall
15 core outer wall
16 first ring inner wall
17 second ring inner wall
18 first ring outer wall
19 second ring outer wall
20 first ring inlet area
21 first ring outlet area
22 second ring inlet area
23 second ring outlet area
70 further ring
A1 axial first clearance
A2 axial second clearance
DA1 first outside diameter
DA2 second outside diameter
DI1 first inside diameter
DI2 second inside diameter
R1 radial first clearance
R2 radial second clearance
R overlap

What is claimed is:

1. A particulate filter for a motor vehicle, comprising:
    a casing having a longitudinal axis and an inner surface allowing through flow through the casing;
    a core accommodated in the casing and spaced inward of the inner surface of the casing, the core allowing through flow and being formed from a particulate-absorbing material;
    a through flow duct formed in the casing between the inner surface of the casing and the core to allow the through flow of exhaust gas from an internal combustion engine of the motor vehicle; and
    at least first and second particulate-absorbing rings arranged in the through flow duct, the first and second rings allowing at least partial through flow therethrough, the first ring being at a first radial position relative to the core and the casing and the second ring being at a second radial position relative to the core and the casing that is different from the first radial position, thereby giving the through flow duct a labyrinth configuration.

2. The particulate filter of claim 1, wherein an axial first clearance is formed between the first ring and the second ring.

3. The particulate filter of claim 2, wherein a first radial clearance is formed between the core and the first ring.

4. The particulate filter of claim 3, wherein a second radial clearance is formed between the inner surface of the casing and the second ring.

5. The particulate filter of claim 1, further comprising a third particulate-absorbing ring axially adjoining one of the first and second particulate-absorbing rings, with an axial second clearance being formed between the third particulate-absorbing ring and the adjoining one of the first and second particulate-absorbing rings.

6. The particulate filter of claim 1, wherein the core is produced from a ceramic material or a metal.

7. A particulate filter, comprising:
    a casing having a longitudinal axis and an inner surface allowing through flow through the casing;
    a core accommodated in the casing and spaced inward of the inner surface of the casing, the core allowing through flow;
    a through flow duct formed in the casing between the inner surface of the casing and the core to allow the through flow of exhaust gas from an internal combustion engine of the motor vehicle; and
    at least first and second circumferentially continuous rings arranged in the through flow duct, wherein a first outside diameter of the first ring is greater than a second outside diameter of the second ring, a first inside diameter of the first ring is greater than a second inside diameter of the second ring, and the first inside diameter is less than the second outside diameter, thereby giving the through flow duct a labyrinth configuration.

8. The particulate filter of claim 7, wherein the rings allows at least partial through flow.

* * * * *